3,245,756
PROCESS FOR THE RECOVERY OF FLUORINE VALUES FROM GASES EVOLVED IN THE PRODUCTION OF PHOSPHATES AND PHOSPHORIC ACID
Albert H. Cooper, Cookeville, Tenn. 38501
No Drawing. Filed June 22, 1954, Ser. No. 438,597
7 Claims. (Cl. 23—88)

This invention relates to a process for the recovery of fluorine from the gases evolved in the production of phosphates and phosphoric acid from phosphatic material containing fluorine, and to the conversion of the fluorine-bearing material to fluorides.

The object of the invention is to recover fluorine by a dry gaseous-phase process of neutralizing the silicon tetrafluoride and hydrogen fluoride in the waste gases and thus reduce corrosion which would result if water scrubbing were used. A further object of the invention is to recover a high concentration of fluorine from low fluorine concentration gases in a dry, solid form of fluoride by a simple and economic process. A further object of the invention is to produce the dry, concentrated fluoride salt directly without resort to the steps of the water absorption, evaporation or concentration and drying. A still further object of the invention is to provide a simple process by which the dry solid fluorine products may be recovered at the site of the phosphate rock processing operation and then transferred to a fluoride processing plant elsewhere, thus adapting the process to recovery of fluorine at any number of isolated phosphate processing plants in a form suitable for transportation to a central fluoride processing plant.

To accomplish these objects of the invention, the gases evolved in the production of phosphoric acid and phosphates are first reacted with gaseous ammonia ($NH_3$) which neutralizes the waste gases and precipitates the silicon tetrafluoride and hydrogen fluoride as a concentrated fluoride salt in solid form. The dry concentrated fluoride salt can then be shipped as such to fluoride processing plants where the product can be converted into various fluoride products.

These and other features of my invention will best be understood and appreciated from the following description of a preferred manner of practicing my process:

The gases which provide the source material for this process are evolved during the processes for producing phosphates and phosphoric acid from phosphatic substances containing fluorine. Examples of such processes are the production of superphosphate fertilizers or phosphoric acid, in which the phosphatic material containing fluorine is reacted with sulfuric acid, thus liberating the said gases. A similar liberation of gases results from the production of defluorinated phosphate rock.

The liberated gases comprises silicon tetrafluoride ($SiF_4$), hydrofluoric acid (HF), phosphate rock dust, air, water vapor and carbon dioxide in relative proportions varying with the particular characteristics of the processes from which they are derived.

In this invention the waste fluorine bearing gases are first driven by a fan through a corrosion-resistant duct to an apparatus for separating the rock dust which is suspended in the gases. The dust separator may be one of several types well known in the art, such as a cyclone or bag air filter.

Thereafter the gases freed from solid dust particles are driven by a fan into a reaction vessel of a type well known in the art, such as a closed tank or a type of cyclone separator, where gaseous ammonia ($NH_3$) is injected and mixed in the gas stream in an amount approximately in stoichiometric equivalents to the fluorine content of the waste gases. The gaseous ammonia may be ammonia anhydrous or ammonia mixed with water vapor. The silicon tetrafluoride and hydrogen fluoride are instantaneously precipitated as a concentrated fluoride salt, a fine crystalline solid, which may agglomerate or be caused to agglomerate to some extent producing particles large enough to settle out in the bottom of the reaction vessel, or cyclone separator. The remaining fine particles are then passed through a gas filter such as a fabric bag filter to remove the fine crystalline particles of fluoride and silica.

The gaseous reaction may be represented as follows:

Dry $3SiF_4 + 2NH_3 \rightarrow 3SiF_4 \cdot 2NH_3$

Moist $3SiF_4 + 4NH_3 + 2H_2O \rightarrow 2(NH_4)_2SiF_6 + SiO_2$

The resulting collection of coarse and fine dry crystals of a concentrated fluoride salt which, when dry ammonia is used is the ammoniate $3SiF_4 \cdot 2NH_3$ and when water vapor is present is ammonium fluosilicate $(NH_4)_2SiF_6$ is then shipped as such to fluoride processing plants where subsequent operations of converting to fluoride products may be carried out on a larger scale more economically. Thus the step of producing the dry solid mixture can be accomplished in small scattered phosphate plants where it would be uneconomical to do the complete processing.

Alternatively, the step of producing the dry solid mixture may be part of a continuous process of fluoride processing in which the dry, solid mixture of a concentrated fluoride salt and silica are leached with water to separate the concentrated fluoride salt from the silica or in which the dry, solid mixture of a concentrated fluoride salt and silica is added to water in order to form a slurry for subsequent processing. Additional anhydrous $NH_3$ or ammonium hydroxide, $NH_4OH$, is then added to the water slurry in proper proportions to give stoichiometric equivalents, or a pH of approximately 8, resulting in the break-up of the concentrated fluoride salt and the production of ammonium fluoride in solution, and in the precipitation of additional silica along with the silica already in the mixture.

The slurry is then filtered, or thickened and filtered, to remove the silica leaving a solution of ammonium fluoride free of silica. The filtered, fine-sized silica can then be dried as a high-purity silica.

The ammonium fluoride solution is then processed further depending on which fluoride product is desired.

For example, to produce $Na_3AlF_6$ (synthetic cryolite), the ammonium fluoride solution is treated with either sodium hydroxide or sodium carbonate and a previously prepared solution of sodium aluminate. The mixture when heated to about 75–85° C. reacts readily to precipitate the complex double salt of sodium aluminum fluoride, $Na_3AlF_6$(synthetic cryolite), which is then filtered, dried and calcined at a temperature range of 500–700° C. to remove all water of hydration and to produce granulation. The step of precipitating the cryolite is carried out at near the boiling point to give a fast reaction rate and to drive off the liberated ammonia which is subsequently absorbed in water to recycle the process.

Other fluorides may be produced by reacting the ammonium fluoride with other materials. The reaction of the ammonium fluoride with alumina will produce aluminum fluoride. The reaction of the ammonium fluoride with potassium, lithium or antimony compounds will produce the corresponding fluorides. The use of potassium and titanium or potassium and zirconium compounds will produce their respective complex salts of $K_2TiF_6$ or $K_2ZrF_6$.

The foregoing description discloses certain forms of the invention, but it will be apparent to those skilled in the art that modifications and improvements of the invention may be made without departing in any way from the spirit or scope of the invention, for the limits of which reference must be had to the appended claims.

Having thus disclosed my invention and described in detail representative embodiments thereof, I claim and desire to secure by Letters Patent:

1. A process for preparing a dry mixture of ammonium fluosilicate and silica which comprises admixing silicon tetrafluoride with at least two-thirds mole of water vapor and at least four-thirds moles of gaseous ammonia per mole of silicon tetrafluoride, thereby forming a dry mixture of finely divided ammonium fluosilicate and silica in an atmosphere free of liquid water and separating said dry mixture from said atmosphere.

2. A process for preparing ammonium fluoride from a dry mixture of ammonium fluosilicate and silica obtained from a reaction of silicon tetrafluoride, water vapor and gaseous ammonia which comprises admixing silicon tetrafluoride with at least two-thirds mole of water vapor, and at least four-thirds moles of gaseous ammonia per mole of silicon tetrafluoride, thereby forming a dry mixture of finely divided ammonium fluosilicate and silica in an atmosphere free of liquid water, separating said dry mixture from said atmosphere, adding said dry mixture to water to form a slurry, adding ammonia to said slurry until the pH thereof is approximately 8 to form an aqueous solution of ammonium fluoride containing fine particles of silica, separating said fine particles of silica from said solution of ammonium fluoride and recovering fine particles of silica and an aqueous solution of ammonium fluoride.

3. An improved process for recovering fluorine values in substantially pure form from a gas mixture containing impure silicon tetrafluoride and water vapor in a ratio of at least two-thirds mole of water vapor per mole of silicon tetrafluoride, which comprises adding to said gas mixture at least 1.33 moles of gaseous ammonia per mole of silicon tetrafluoride in an atmosphere free of liquid water, thereby forming a dry, finely divided mixture of ammonium fluosilicate and silica in said atmosphere, filtering said finely divided mixture from the gaseous reactants in said atmosphere free of liquid water, mixing water with said mixture to form a solution of ammonium fluosilicate containing solid silica, adding ammonia to said solution until the pH thereof is approximately 8 to form an aqueous solution of ammonium fluoride containing fine particles of silica, separating said fine particles of silica from said solution of ammonium fluoride and recovering fine particles of silica and an aqueous solution of ammonium fluoride.

4. A process for preparing ammonium fluoride from a dry, finely divided mixture of ammonium fluosilicate and silica obtained from the reaction of silicon tetrafluoride, water vapor and gaseous ammonia which comprises admixing silicon tetrafluoride-containing gas containing at least two-thirds mole of water vapor per mole of silicon tetrafluoride with at least four-thirds moles of gaseous ammonia per mole of silicon tetrafluoride in an atmosphere free of liquid water, filtering the resulting finely divided mixture of ammonium fluosilicate and silica from the gaseous reactants in said atmosphere free of liquid water adding said mixture to water to form a slurry, adding ammonia to said slurry until the pH thereof is approximately 8 to form an aqueous solution of ammonium fluoride containing fine particles of silica, separating said fine particles of silica from said solution of ammonium fluoride and recovering fine particles of silica and an aqueous solution of ammonium fluoride.

5. A process for preparing ammonium fluoride from a dry, finely divided mixture of ammonium fluosilicate and silica obtained from the reaction of silicon tetrafluoride, water vapor and gaseous ammonia which comprises admixing off-gases of the phosphate rock acidulation process containing silicon tetrafluoride and at least two-thirds mole of water vapor per mole of silicon tetrafluoride with at least four-thirds moles of gaseous ammonia per mole of silicon tetrafluoride in an atmosphere free of liquid water, filtering the finely divided ammonium fluosilicate and silica mixture from the gaseous reactants in said atmosphere free of liquid water adding said mixture to water to form a slurry, adding ammonia to said slurry until the pH thereof is approximately 8 to form an aqueous solution of ammonium fluoride containing fine particles of silica, separating said fine particles of silica from said solution of ammonium fluoride and recovering fine particles of silica and an aqueous solution of ammonium fluoride.

6. A process for recovering fluorine values from a gaseous mixture containing silicon tetrafluoride comprising adding to said mixture at least two-thirds mole of water vapor and four-thirds moles of ammonia per mole of silicon tetrafluoride in an atmosphere free of liquid water, thereby inducing the formation of ammonium fluosilicate and silica in admixture as a finely divided solid in said atmosphere, filtering said admixture of ammonium fluosilicate and silica from said gaseous mixture in said atmosphere free of liquid water adding said mixture to water to form a slurry, adding ammonia to said slurry until the pH thereof is approximately 8 to form an aqueous solution of ammonium fluoride containing fine particles of silica, separating said fine particles of silica from said solution of ammonium fluoride and recovering fine particles of silica and an aqueous solution of ammonium fluoride.

7. A process for forming ammonium fluoride from ammonium fluosilicate obtained from the reaction of silicon tetrafluoride, water vapor and gaseous ammonia comprising adding to a silicon tetrafluoride-containing gas at least two-thirds mole of water vapor and four-thirds moles of gaseous ammonia per mole of silicon tetrafluoride in an atmosphere free of liquid water, thereby forming silica and ammonium fluosilicate as a mixture of dry, finely divided solids in said atmosphere, filtering said finely divided solids from said reaction mixture in said atmosphere free of liquid water adding said solids to water to form a slurry, adding ammonia to said slurry until the pH thereof is approximately 8 to form an aqueous solution of ammonium fluoride containing fine particles of silica, separating said fine particles of silica from said solution of ammonium fluoride and recovering fine particles of silica and an aqueous solution of ammonium fluoride.

References Cited by the Examiner

UNITED STATES PATENTS

| | | | |
|---|---|---|---|
| 1,015,220 | 1/1912 | Teisler | 23—88 |
| 1,235,552 | 8/1917 | Chappell | 23—88 |
| 1,382,165 | 6/1921 | Bishop | 23—88 |
| 1,859,998 | 5/1932 | Svendsen | 23—88 X |
| 1,911,004 | 5/1933 | Svendsen | 23—88 |
| 2,024,008 | 12/1935 | Midgley | 23—88 |
| 2,075,370 | 3/1937 | Strathmeyer | 23—88 |
| 2,141,773 | 12/1938 | Strathmeyer | 23—88 |
| 2,500,792 | 3/1950 | Blythe et al. | 23—88 X |
| 2,584,894 | 2/1952 | MacIntire | 23—88 |
| 2,687,341 | 8/1954 | Mockrin | 23—88 |
| 2,785,953 | 3/1957 | Fitch | 23—88 |
| 2,796,333 | 6/1957 | Wade | 23—88 X |

OTHER REFERENCES

"Fluorine Control and Recovery," Canadian Chem. and Metallurgy, August 1937, pages 271–274.

MAURICE A. BRINDISI, *Primary Examiner.*

BENJAMIN HENKIN, *Examiner.*